US009736831B2

(12) United States Patent
Jiang et al.

(10) Patent No.: US 9,736,831 B2
(45) Date of Patent: Aug. 15, 2017

(54) METHOD AND DEVICE FOR INDICATING MODULATION AND CODING SCHEME, AND METHOD AND DEVICE FOR RECEIVING DOWNLINK DATA

(71) Applicant: CHINA MOBILE COMMUNICATIONS CORPORATION, Beijing (CN)

(72) Inventors: Dajie Jiang, Beijing (CN); Zhihua Shi, Beijing (CN); Fei Wang, Beijing (CN); Lijie Hu, Beijing (CN); Zhenping Hu, Beijing (CN)

(73) Assignee: CHINA MOBILE COMMUNICATIONS CORPORATION, Beijing (CN)

( * ) Notice: Subject to any disclaimer, the term of this patent is extended or adjusted under 35 U.S.C. 154(b) by 81 days.

(21) Appl. No.: 14/766,308

(22) PCT Filed: Jan. 28, 2014

(86) PCT No.: PCT/CN2014/071669
§ 371 (c)(1),
(2) Date: Aug. 6, 2015

(87) PCT Pub. No.: WO2014/121723
PCT Pub. Date: Aug. 14, 2014

(65) Prior Publication Data
US 2015/0382328 A1  Dec. 31, 2015

(30) Foreign Application Priority Data
Feb. 6, 2013  (CN) .......................... 2013 1 0048576

(51) Int. Cl.
H04W 72/04  (2009.01)
H04L 1/18   (2006.01)
(Continued)

(52) U.S. Cl.
CPC ........... *H04W 72/042* (2013.01); *H04L 1/001* (2013.01); *H04L 1/0004* (2013.01);
(Continued)

(58) Field of Classification Search
CPC ........ H04L 5/12; H04L 27/2075; H04B 14/02
See application file for complete search history.

(56) References Cited

U.S. PATENT DOCUMENTS

2014/0092785 A1* 4/2014 Song ........................ H04L 1/00
                                                    370/280
2014/0169297 A1* 6/2014 Kim ...................... H04L 5/0092
                                                    370/329
(Continued)

FOREIGN PATENT DOCUMENTS

CN   101674149 A   3/2010
CN   102624481 A   8/2012
(Continued)

OTHER PUBLICATIONS

Chinese Office Action dated Oct. 10, 2016 for Chinese Application No. 201310048576.0 with English translation.
(Continued)

Primary Examiner — Andrew Lai
Assistant Examiner — Zhiren Qin
(74) Attorney, Agent, or Firm — Ladas & Parry LLP

(57) ABSTRACT

The present disclosure provides a method for indicating a modulation and coding scheme (MCS), including a step of when it is determined that a UE supports a downlink 256QAM mode, indicating the 256QAM mode using current information indicating the MCS or extended information indicating the MCS in downlink control information (DCI). The present disclosure further provides a method for receiving downlink data, including a step of, after a UE has received information indicating an MCS which includes
(Continued)

indication information indicating a 256QAM mode, receiving the downlink data according to the 256QAM mode and a corresponding TBS index. The present disclosure further provides devices for implementing the above methods.

16 Claims, 2 Drawing Sheets

(51) Int. Cl.
*H04L 5/00* (2006.01)
*H04L 27/36* (2006.01)
*H04L 1/00* (2006.01)

(52) U.S. Cl.
CPC .......... *H04L 1/0006* (2013.01); *H04L 1/0009* (2013.01); *H04L 1/0025* (2013.01); *H04L 1/1896* (2013.01); *H04L 5/0016* (2013.01); *H04L 5/0053* (2013.01); *H04L 27/362* (2013.01); *H04W 72/048* (2013.01); *H04L 1/0026* (2013.01)

(56) References Cited

U.S. PATENT DOCUMENTS

| | | | | |
|---|---|---|---|---|
| 2014/0169300 A1* | 6/2014 | Kim | ...................... | H04L 5/0057 370/329 |
| 2015/0372784 A1* | 12/2015 | Xu | .......................... | H04L 27/36 370/329 |
| 2015/0381310 A1* | 12/2015 | Hammarwall | ........ | H04L 1/0003 370/329 |
| 2016/0226623 A1* | 8/2016 | Froberg Olsson | .... | H04L 1/0023 |

FOREIGN PATENT DOCUMENTS

| | | |
|---|---|---|
| CN | 102624501 A | 8/2012 |
| CN | 101674149 B | 11/2012 |
| WO | 2010/025613 A1 | 3/2010 |
| WO | 2013/123961 A1 | 8/2013 |

OTHER PUBLICATIONS

International Search Report dated Apr. 30, 2014 for Application No. PCT/CN2014/071669.
Espacenet English abstract of CN 102624481 A.
Espacenet English abstract of CN 102624501 A.
Espacenet English abstract of WO 2010/025613 A1.
Supplementary European Search Report mailed Jul. 4, 2016 for Application No. EP 14 74 9464.
Written Opinion of the International Searching Authority dated Apr. 30, 2014 for International Application No. PCT/CN2014/71669, and its English translation.
HTC: "On Small Cell Enhancement for Improved Spectral Efficiency", 3GPP Draft; R1-130311, 3rd Generation Partnership Project (3GPP), Mobile Competence Centre, vol. RAN WG1, no. St. Julian, Jan. 18, 2013, 4 pages.
ZTE: "Consideration on high order modulation for small cell", 3GPP draft; R1-130136, vol. RAN WG1, no. St. Julian, Jan. 19, 2013, 6 pages.

* cited by examiner

METHOD AND DEVICE FOR INDICATING MODULATION AND CODING SCHEME, AND METHOD AND DEVICE FOR RECEIVING DOWNLINK DATA

CROSS-REFERENCE TO RELATED APPLICATION

The present application is the U.S. national phase of PCT Application No. PCT/CN2014/071669 filed on Jan. 28, 2014, which claims a priority of the Chinese patent application No. 201310048576.0 filed on Feb. 6, 2013 and entitled "method and device for indicating modulation and coding scheme, and method and device for receiving downlink data", which are incorporated herein by reference in their entirety.

TECHNICAL FIELD

The present disclosure relates to the field of technologies for indicating a modulation and coding scheme (MCS) and receiving downlink data, in particular to a method and a device for indicating an MCS, and a method and a device for receiving downlink data.

BACKGROUND

In the $3^{rd}$ Generation Partnership Project (3GPP) Long Term Evolution (LTE) Releases 8 to 11, such modulation modes as Quadrature Phase Shift Keying (QPSK), 16QAM and 64QAM, with modulation orders of 2, 4 and 6, respectively, may be used for the transmission of downlink data. For different channel coding rates, there are 29 different MCSs for the downlink data transmission, which correspond to $I_{MCS}$ 0 to 28 in Table 1, respectively.

TABLE 1

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |

TABLE 1-continued

| MCS Index $I_{MCS}$ | Modulation Order $Q_m$ | TBS Index $I_{TBS}$ |
|---|---|---|
| 29 | 2 | reserved |
| 30 | 4 | |
| 31 | 6 | |

In Table 1, rows corresponding to $I_{MCS}$ 29, 30 and 31 represent the modulation modes, i.e., QPSK, 16QAM and 64QAM, for a retransmitted downlink data packet, respectively. In downlink control information (DCI), 5 bits are used to indicate different MCSs, i.e., $I_{MCS}$ 0 to 31. A second column in Table 1 represents the modulation orders, e.g., the modulation orders for QPSK, 16QAM and 64QAM are 2, 4 and 6, respectively. A third column in Table 1 represents a downlink transport block size (TBS), and different values represent different TBS indices.

It will be considered in the standardization of the 3GPP LTE Release 12 to introduce downlink 256QAM into the Small Cell Enhancement Project, so as to further increase a downlink data rate in the room and at hot regions. However, in the LTE Releases 8 to 11, the DCI can merely be used to indicate QPSK, 16QAM and 64QAM for the downlink data transmission, rather than 256QAM.

Currently, there is an urgent need to introduce 256QAM into the 3GPP LTE Release 12. However, the 3GPP LTE Release 12 is still in a research phase, and no scheme has been proposed for indicating 256QAM for the DCI.

SUMMARY

A main object of the present disclosure is to provide a method and a device for indicating an MCS, and a method and a device for receiving downlink data, so as to indicate the corresponding MCS for a user equipment (UE) which supports downlink 256QAM in the 3GPP LTE Release 12, and to enable the UE to receive the downlink data transmitted using 256QAM, thereby to improve the downlink data transmission efficiency.

In one aspect, the present disclosure provides in one embodiment a method for indicating an MCS, including a step of:

when it is determined that a UE supports a downlink 256QAM mode, indicating the 256QAM mode using current information indicating the MCS or extended information indicating the MCS in downlink control information (DCI).

Alternatively, the step of indicating the 256QAM mode using the current information indicating the MCS or the extended information indicating the MCS in the DCI includes:

indicating the 256QAM mode using the last three pieces of indication information in the current information indicating the MCS in the DCI, and enabling a transport block size (TBS) index for the 256QAM mode to be different from those for the other modulation modes; or indicating the 256QAM mode using the last three pieces of indication information in the current information indicating the MCS in the DCI, and enabling a TBS index for the 256QAM mode to be partially identical to those for the other modulation modes; or reducing indication information indicating the other modulation modes from the current information indicating the MCS in the DCI, and indicating the 256QAM mode using the last three pieces of indication information and the saved pieces of indication information indicating the other modulation modes in the current information indicating the MCS.

Alternatively, the step of enabling the TBS index for the 256QAM mode to be partially identical to those for the other modulation modes includes:

enabling a TBS index for the $30^{th}$ piece of indication information indicating the 256QAM mode to be identical to that of the $29^{th}$ piece of indication information indicating a 64QAM mode, and enabling TBS indices for the $31^{st}$ piece of indication information and the $32^{nd}$ piece of indication information indicating the 256QAM to be different from the TBS indices for the other modulation modes.

Alternatively, the step of reducing indication information indicating the other modulation modes from the current information indicating the MCS in the DCI, and indicating the 256QAM mode using the last three pieces of indication information and the saved pieces of indication information indicating the other modulation modes in the current information indicating the MCS includes:

deleting the last piece of indication information from each of the pieces of indication information indicating the QPSK mode, the pieces of indication information indicating the 16QAM mode and the pieces of indication information indicating the 64QAM mode, respectively, and indicating the 256QAM mode using the last six pieces of indication information; or deleting one piece of indication information from each of the pieces of indication information indicating the QPSK mode, the pieces of indication information indicating the 16QAM mode and the pieces of indication information indicating the 64QAM mode, and indicating the 256QAM mode using the last six pieces of indication information; or deleting at most five pieces of indication information from the pieces of indication information indicating the QPSK, 16QAM and 64QAM modes, and indicating the 256QAM mode using the last three pieces of indication information and the saved pieces of indication information indicating the other modulation modes.

Alternatively, the step of indicating the 256QAM mode using the extended information indicating the MCS includes:

adding one bit to the information indicating the MCS in the DCI; and taking the preceding 29 pieces of indication information as the original indication information indicating the other modulation modes, taking the $30^{th}$ to the $38^{th}$ pieces of indication information as the indication information indicating the 256QAM mode, taking the $39^{th}$ to $42^{nd}$ pieces of indication information as the indication information indicating the QPSK, 16QAM, 65QAM and 256QAM modes for the retransmitted downlink data, and taking the other pieces of indication information as the reserved indication information; or taking the preceding 29 pieces of indication information as the original indication information indicating the other modulation modes, taking the $30^{th}$ to $38^{th}$ pieces of indication information as the indication information indicating the 256QAM mode, and taking the other pieces of indication information as the reserved indication information.

In another aspect, the present disclosure provides in one embodiment a method for receiving downlink data, including a step of:

after a UE has received information indicating an MCS which includes indication information indicating a 256QAM mode, receiving the downlink data according to the 256QAM mode and a corresponding TBS index.

In yet another aspect, the present disclosure provides in one embodiment a device for indicating an MCS, including a determination unit and an indication unit. The determination unit is configured to determine whether or not a UE supports a downlink 256QAM mode, and if yes, activate the indication unit. The indication unit is configured to indicate the 256QAM mode using current information indicating the MCS or extended information indicating the MCS in downlink control information (DCI).

Alternatively, the indication unit is further configured to indicate the 256QAM mode using the last three pieces of indication information in the current information indicating the MCS in the DCI, and enable a TBS index for the 256QAM mode to be different from those for the other modulation modes; or the indication unit is further configured to indicate the 256QAM mode using the last three pieces of indication information in the current information indicating the MCS in the DCI, and enable a TBS index for the 256QAM mode to be partially identical to those for the other modulation modes; or the indication unit is further configured to reduce indication information indicating the other modulation modes from the current information indicating the MCS in the DCI, and indicate the 256QAM mode using the last three pieces of indication information and the saved pieces of indication information indicating the other modulation modes in the current information indicating the MCS.

Alternatively, the indication unit is further configured to enable a TBS index for the $30^{th}$ piece of indication information indicating the 256QAM mode to be identical to that of the $29^{th}$ piece of indication information indicating a 64QAM mode, and enable TBS indices for the $31^{st}$ piece of indication information and the $32^{nd}$ piece of indication information indicating the 256QAM to be different from the TBS indices for the other modulation modes.

Alternatively, the indication unit is further configured to delete the last piece of indication information from each of the pieces of indication information indicating the QPSK mode, the pieces of indication information indicating the 16QAM mode and the pieces of indication information indicating the 64QAM mode, respectively, and indicating the 256QAM mode using the last six pieces of indication information; or delete one piece of indication information from each of the pieces of indication information indicating the QPSK mode, the pieces of indication information indicating the 16QAM mode and the pieces of indication information indicating the 64QAM mode, and indicate the 256QAM mode using the last six pieces of indication information; or delete at most five pieces of indication information from the pieces of indication information indicating the QPSK, 16QAM and 64QAM modes, and indicate the 256QAM mode using the last three pieces of indication information and the saved pieces of indication information indicating the other modulation modes.

Alternatively, the indication unit is further configured to add one bit to the information indicating the MCS in the DCI; and take the preceding 29 pieces of indication information as the original indication information indicating the other modulation modes, take the $30^{th}$ to $38^{th}$ pieces of indication information as the indication information indicating the 256QAM mode, take the $39^{th}$ to $42^{nd}$ pieces of indication information as the indication information indicating the QPSK, 16QAM, 65QAM and 256QAM modes for the retransmitted downlink data, and take the other pieces of indication information as the reserved indication information, or take the preceding 29 pieces of indication information as the original indication information indicating the other modulation modes, take the $30^{th}$ to $38^{th}$ pieces of indication information as the indication information indicating the 256QAM modulation mode, and take the other pieces of indication information as the reserved indication information In still yet another aspect, the present disclosure provides in one embodiment a device for receiving downlink data, including:

a control reception unit configured to receive information indicating an MCS which includes indication information indicating a 256QAM mode; and a data reception unit configured to receive the downlink data according to the 256QAM mode and a corresponding TBS index.

Alternatively, the device further includes a transmission unit configured to report information indicating that the device is capable of supporting a downlink 256QAM mode to a base station.

According to the embodiments of the present disclosure, at a network side, when a base station determines that the UE supports the downlink 256QAM mode, the current information indicating the MCS or the extended information indicating the MCS in the DCI is used to indicate the 256QAM mode. As a result, it is able to cause the UE to receive the downlink data according to the indication information indicating the 256QAM mode, thereby to improve the data transmission efficiency.

DETAILED DESCRIPTION

As a basic idea of the present disclosure, at a network side, when it is determined that a UE supports a downlink 256QAM mode, current information indicating an MCS or extended information indicating the MCS in DCI is used to indicate the 256QAM mode. As a result, it is able to cause the UE to receive downlink data according to the indication information indicating the 256QAM mode, thereby to improve the data transmission efficiency.

In order to make the objects, the technical solutions and the advantages of the present disclosure more apparent, the present disclosure will be described hereinafter in conjunction with the drawings and embodiments.

Figure 1:
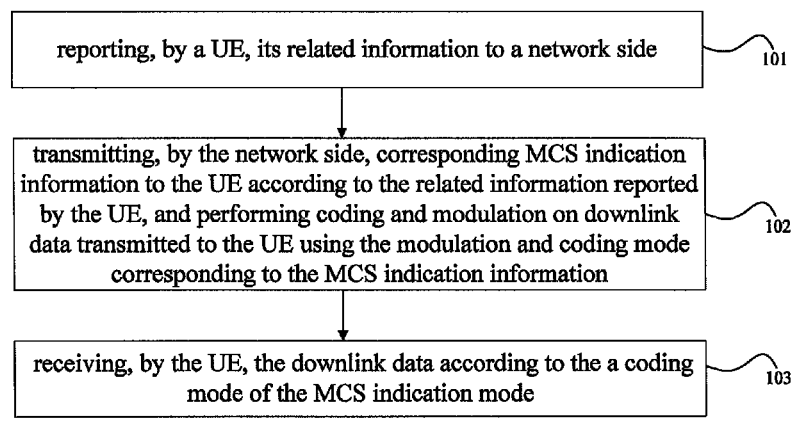
FIG. 1 is a flow chart of a method for indicating an MCS and receiving downlink data according to one embodiment of the present disclosure.

As shown in FIG. 1, which is a flow chart of a method for indicating an MCS and receiving downlink data according to one embodiment of the present disclosure, the method includes the following steps.

Step 101: reporting, by a UE, its related information to a network side.

To be specific, the UE reports its related information (e.g., UE capability information) to the network side, e.g., a base station, and then the base station determines whether or not the UE supports a downlink 256QAM mode according to the related information (e.g., the UE capability information) reported by the UE.

Step 102: transmitting, by the network side, corresponding MCS indication information to the UE according to the related information reported by the UE, and performing coding and modulation on the downlink data transmitted to the UE using the modulation and coding mode corresponding to the MCS indication information.

To be specific, when the base station determines that the UE supports the downlink 256QAM coding mode, it uses a new MCS indication mode in DCI transmitted to the UE, so as to indicate the UE to receive the downlink data according to the 256QAM coding mode. When the base station determines that the UE does not support the downlink 256QAM coding mode, i.e., it determines that the UE is of an older release selected from LTE Releases 8 to 11, the base station uses an original MCS indication mode in the DCI transmitted to the UE, i.e., a 5-bit MCS indication mode mentioned in LTE Releases 8 to 11.

Step 103: receiving, by the UE, the downlink data according to the coding mode of the MCS indication mode.

To be specific, after the UE has received the information indicating the MCS which includes the indication information indicating a 256QAM mode, it receives the downlink data according to the 256QAM mode and a corresponding TBS index, i.e., it demodulates and decodes the downlink data using the 256QAM mode and the corresponding TBS index.

The last three rows in Table 1 (i.e., the rows where the MCS indices are 29, 30 and 31, the MCS orders are 2, 4 and 6, and the TBS index is reserved) should have used as MCS indicators for downlink HARQ retransmission. However, during the actual application, there exists redundancy in the last three indicators in Table 1. At first, it is unnecessary to use the last three indicators to determine that a downlink data packet is a newly-transmitted data packet (i.e., the data packet that is transmitted for the first time) or a HARQ retransmitted packet. This is because, apart from the 5-bit MCS indication information, the DCI carried by PDCCH further includes the other information, e.g., bits for indicating a HARQ process number and bits for indicating a new data indicator (NDI). Taking FDD as an example, 3 bits are used to indicate the HARQ process number (for TDD, 4 bits are used), and one bit is used to indicate the NDI. The HARQ process number and the NDI are sufficient to indicate whether the data packet is a newly-transmitted data packet or a re-transmitted data packet. Its indication rule will be described as follows. When the NDIs of two consecutive data packets on an identical HARQ process are overturned (i.e., 0 to 1, or 1 to 0), a transport block of the second data packet is different from that of the first data packet, and the second data packet is a new data packet. On the contrary, when the NCIs of two consecutive data packets on an identical HARQ process are not overturned (i.e., 0 to 0, or 1 to 1), the transport block of the second data packet is identical to that of the first data packet. Since whether or not the data packet is a retransmitted or a newly-transmitted one may be indicated by the bits of the HARQ process number and the NDI, the MCS and the TBS index may also be indicated by the preceding 29 rows in Table 1. Hence, the last three rows in Table 1 belong to redundancy information. According to the embodiments of the present disclosure, the last three pieces of MCS indication information (the indication information corresponding to the last three rows in Table 1) in 5 bits for indicating the MCS in the DCI mentioned in LTE Releases 8 to 11 are reused to indicate a new MCS coding mode, so as to ensure a new system to be compatible with an older system in an appropriate manner.

The 256QAM indication modes will be described hereinafter. In the embodiments of the present disclosure, there are the following five new MCS indication modes that support downlink 256QAM.

Mode 1: 5 bits for indicating the MCS in the DCI mentioned in LTE Releases 8 to 11 are reused. Among the 32 pieces of indication information represented by these 5 bits, the preceding 29 pieces of indication information maintain their meanings unchanged, while the meanings of the last three pieces of indication information are changed. The last three pieces of MCS indication information indicate different code rates for the 256QAM coding mode, and the TBS indices for the 256QAM mode of the last three pieces are different from the TBS indices for the other coding modes of the preceding 29 pieces of indication information. The specific indication mode is shown in Table 2. This mode aims to indicate the 256QAM coding mode for the current downlink data using the last three redundant indicators in Table 1.

TABLE 2

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 8 | 27 |
| 30 | 8 | 28 |
| 31 | 8 | 29 |

In Table 2, the preceding 29 pieces of indication information in the DCI are identical to those mentioned in LTE Releases 8 to 11. Among them, the preceding 10 pieces of indication information are used to indicate the QPSK coding mode and its corresponding TBS index, the pieces of indication information represented by $I_{MCS}$ 10 to 16 are used to indicate the 16QAM coding mode and its corresponding TBS index, and the pieces of indication information represented by $I_{MCS}$ 17 to 28 are used to indicate the 64QAM coding mode and its corresponding TBS index.

Mode 2: 5 bits for indicating the MCS in the DCI mentioned in LTE Releases 8 to 11 are reused. Among the 32 pieces of indication information represented by these 5 bits, the preceding 29 pieces of indication information maintain their meanings unchanged, while the meanings of the last three pieces of indication information are changed. The last three pieces of indication information indicate different code rates for the 256QAM coding mode. The TBS indices for the coding modes represented by $I_{MCS}$ 28 and 29 are identical to each other, and the TBS indices for the 256QAM coding mode represented by $I_{MCS}$ 30 and 31 are different from those for the preceding 30 pieces of indication information. The specific indication mode is shown in Table 3.

TABLE 3

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 8 | 26 |
| 30 | 8 | 27 |
| 31 | 8 | 28 |

Mode 3: 5 bits are used in the DCI to indicate a downlink MCS. As compared with the downlink MCS mentioned in LTE Releases 8 to 11, types of the MCS for the QPSK and/or 16QAM and/or 64QAM are reduced, so as to remove all of, or a part of, the types of the MCS from the last three (29, 30 and 31) pieces of indication information indicating a retransmission modulation mode, thereby to indicate different code rates for the 256QAM using the saved pieces of MCS indication information. For example, as shown in Table 4, one piece of indication information may also be deleted from each of the pieces of indication information indicating the QPSK, 16QAM and 64QAM modes, and the last six pieces of indication information may be used to indicate the 256QAM mode; or at most 5 pieces of indication information may be deleted from the pieces of indication information indicating the QPSK, 16QAM and 64QAM modes, and the last three pieces of indication information and the saved pieces of indication information indicating the other modulation modes may be used to indicate the 256QAM mode. The specific indication modes may refer to Table 4-1 and they will not be listed herein. On the basis of Mode 1, this mode further includes, apart from changing the meanings of the last three pieces of MCS indication information, reducing the number of the pieces of the indication information for the QPSK, 16QAM and 64QAM, and indicating the 256QAM using all the saved pieces of MCS indication information, so there are more than three types of indicators for the 256QAM. In this mode, as a principle for reducing the number of the pieces of indication information for the QPSK, 16QAM and 64QAM, the adjacent two pieces of indication information in the last column in Table 1 have substantially the same meaning, i.e., the TBS index therefor is 9 or 15. Because these two adjacent pieces of indication information have the same TBS index but the different MCSs, one of them may be selected so as to reduce the number of the pieces of the indication information. The number of the indicators for the QPSK, 16QAM and 64QAM may be appropriately reduced, and the number of the indicators for the 256QAM may be increased correspondingly.

TABLE 4-1

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 4 | 9 |
| 10 | 4 | 10 |
| 11 | 4 | 11 |
| 12 | 4 | 12 |
| 13 | 4 | 13 |
| 14 | 4 | 14 |
| 15 | 6 | 15 |
| 16 | 6 | 16 |
| 17 | 6 | 17 |
| 18 | 6 | 18 |
| 19 | 6 | 19 |
| 20 | 6 | 20 |
| 21 | 6 | 21 |
| 22 | 6 | 22 |
| 23 | 6 | 23 |
| 24 | 6 | 24 |
| 25 | 6 | 25 |
| 26 | 8 | 26 |
| 27 | 8 | 27 |
| 28 | 8 | 28 |
| 29 | 8 | 29 |
| 30 | 8 | 30 |
| 31 | 8 | 31 |

Table 4-2 shows another mode for reducing the number of the pieces of indication information for the QPSK, 16QAM and 64QAM. As compared with the mode in Table 4-1, the mode in Table 4-2 is more flexible. The meanings of the respective pieces of indication information in Table 4-2 are the same as those in Table 4-1, and thus will not be repeated herein.

TABLE 4-2

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 or 4 | 9 |
| 10 | 4 | 10 |
| 11 | 4 | 11 |
| 12 | 4 | 12 |
| 13 | 4 | 13 |
| 14 | 4 | 14 |
| 15 | 4 or 6 | 15 |
| 16 | 6 | 16 |
| 17 | 6 | 17 |
| 18 | 6 | 18 |
| 19 | 6 | 19 |
| 20 | 6 | 20 |
| 21 | 6 | 21 |
| 22 | 6 | 22 |
| 23 | 6 | 23 |
| 24 | 6 | 24 |
| 25 | 6 | 25 |
| 26 | 6 or 8 | 26 |
| 27 | 8 | 27 |
| 28 | 8 | 28 |
| 29 | 8 | 29 |
| 30 | 8 | 30 |
| 31 | 8 | 31 |

Mode 4: 6 bits are used in the DCI to indicate the downlink MCS (including the 256QAM). Four pieces of indication information preceding the reserved indication information are used to indicate the modulation modes, i.e., QPSK, 16QAM, 64QAM and 256QAM, for the retransmitted downlink data, respectively. Table 5 shows one of the examples.

TABLE 5

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |

TABLE 5-continued

| MCS Index $I_{MCS}$ | Modulation Order $Q_m$ | TBS Index $I_{TBS}$ |
|---|---|---|
| 28 | 6 | 26 |
| 29 | 8 | 26 |
| 30 | 8 | 27 |
| 31 | 8 | 28 |
| 32 | 8 | 29 |
| 33 | 8 | 30 |
| 34 | 8 | 31 |
| 35 | 8 | 32 |
| 36 | 8 | 33 |
| 37 | 8 | 34 |
| 38 | 2 | reserved |
| 39 | 4 | |
| 40 | 6 | |
| 41 | 8 | |
| 42-63 | | reserved |

As shown in Table 5, for the 6-bit indication information indicating the downlink MCS, the preceding 29 pieces of indication information have the meanings completely identical to the pieces of indication information indicating the downlink MCS in the DCI mentioned in LTE Releases 8 to 11, the 30th to 38th pieces of indication information indicating the downlink MCS are used to indicate the 256QAM coding mode, the $39^{th}$ to $42^{nd}$ pieces of indication information are used to indicate the QPSK, 16QAM, 64QAM and 256QAM coding modes for the retransmitted downlink data, and the $43^{rd}$ to $64^{th}$ pieces of indication information indicating the downlink MCS are used as reserved indication information.

Mode 5: 6 bits in the DCI are used to indicate the downlink MCS (including 256QAM), without including the meaning of the modulation mode for indicating the retransmission. Table 6 shows one of the examples.

TABLE 6

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 8 | 26 |
| 30 | 8 | 27 |
| 31 | 8 | 28 |
| 32 | 8 | 29 |
| 33 | 8 | 30 |
| 34 | 8 | 31 |
| 35 | 8 | 32 |
| 36 | 8 | 33 |
| 37 | 8 | 34 |
| 38-63 | | reserved |

As shown in Table 6, for the 6-bit indication information indicating the downlink MCS, the preceding 29 pieces of indication information have the meanings completely identical to the pieces of indication information indicating the downlink MCS in the DCI mentioned in LTE Releases 8 to 11, the $30^{th}$ to $38^{th}$ pieces of indication information indicating the downlink MCS are used to indicate the 256QAM coding mode, and the $39^{th}$ to $64^{th}$ pieces of indication information indicating the downlink MCS are used as the reserved indication information.

It should be appreciated that, the above examples where the indication information indicating the MCS is used to indicate the corresponding coding mode are for illustrative purposes only, but shall not be used to limit the present disclosure.

After the UE has received the indication information indicating the MCS, it receives, according to the meanings of the indication information indicating the MCS configured in advance or indicated at the network side, the downlink data using the coding mode corresponding to the received indication information indicating the MCS.

Figure 2:
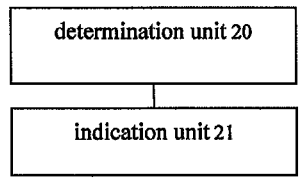
FIG. 2 is a block diagram of a device for indicating an MCS according to one embodiment of the present disclosure.

As shown in FIG. 2, which is a block diagram of a device for indicating the MCS according to one embodiment of the present disclosure, the device includes a determination unit 20 and an indication unit 21. The determination unit 20 is configured to determine whether or not the UE supports a downlink 256QAM mode, and when it supports the downlink 256QAM mode and the downlink data from the UE is to be transmitted, activate the indication unit 21. The indication unit 21 is configured to indicate the 256QAM mode using current information indicating the MCS or extended information indicating the MCS in the DCI.

The indication unit 21 is further configured to indicate the 256QAM mode using the last three pieces of indication information in the current information indicating the MCS in the DCI, and enable a TBS index for the 256QAM mode to be different from those for the other modulation modes.

Alternatively, the indication unit 21 is further configured to indicate the 256QAM mode using the last three pieces of indication information in the current information indicating the MCS in the DCI, and enable the TBS index for the 256QAM mode to be partially identical to those for the other modulation modes.

Alternatively, the indication unit 21 is further configured to reduce the indication information indicating the other modulation modes from the current information indicating the MCS in the DCI, and indicate the 256QAM mode using the last three pieces of indication information and the reduced indication information indicating the other modulation modes in the current information indicating the MCS.

The TBS index for the 256QAM mode being partially identical to those for the other modulation modes includes a TBS index for the $30^{th}$ piece of indication information indicating the 256QAM mode being identical to that of the 29$^{th}$ piece of indication information indicating a 64QAM mode, and TBS indices for the 31$^{st}$ piece of indication information and the 32$^{nd}$ piece of indication information indicating the 256QAM being different from the TBS indices for the other modulation modes.

The indication unit 21 is further configured to delete the last piece of indication information from each of the pieces of indication information indicating the QPSK mode, the pieces of indication information indicating the 16QAM mode and the pieces of indication information indicating the 64QAM mode, respectively, and indicating the 256QAM mode using the last six pieces of indication information; or delete one piece of indication information from each of the pieces of indication information indicating the QPSK mode, the pieces of indication information indicating the 16QAM mode and the pieces of indication information indicating the 64QAM mode, and indicate the 256QAM mode using the last six pieces of indication information; or delete at most five pieces of indication information from the pieces of indication information indicating the QPSK, 16QAM and 64QAM modes, and indicate the 256QAM mode using the last three pieces of indication information and the saved pieces of indication information indicating the other modulation modes.

The indication unit 21 is further configured to add one bit to the information indicating the MCS in the DCI; and take the preceding 29 pieces of indication information as the original indication information indicating the other modulation modes, take the 30$^{th}$ to 38$^{th}$ pieces of indication information as the indication information indicating the 256QAM mode, take the 39$^{th}$ to 42$^{nd}$ pieces of indication information as the indication information indicating the QPSK, 16QAM, 65QAM and 256QAM modes for the retransmitted downlink data, and take the other pieces of indication information as the reserved indication information, or take the preceding 29 pieces of indication information as the original indication information indicating the other modulation modes, take the 30$^{th}$ to 38$^{th}$ pieces of indication information as the indication information indicating the 256QAM modulation mode, and take the other pieces of indication information as the reserved indication information.

It should be appreciated that, the device for indicating the MCS in FIG. 2 is applicable to a network element at the network side, e.g., a base station.

It should be appreciated that, the functions of the units included in the device for indicating the MCS in FIG. 2 may refer to the above-mentioned method for indicating the MCS and receiving the downlink data. These functions of the units may be implemented by programs running on a processor, or by logic circuits.

Figure 3:
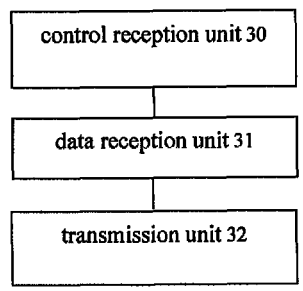
FIG. 3 is a block diagram of a device for receiving downlink data according to one embodiment of the present disclosure.

As shown in FIG. 3, which is a block diagram of a device for receiving the downlink data according to one embodiment of the present disclosure, the device includes a control reception unit 30 and a data reception unit 31. The control reception unit 30 is configured to receive information indicating the MCS which includes indication information indicating a 256QAM mode. The data reception unit 31 is configured to receive the downlink data according to the 256QAM mode and a corresponding TBS index.

On the basis of FIG. 3, the device for receiving the downlink data further includes a transmission unit 32 configured to, after receiving the information indicating the MCS which includes indication information indicating the 256QAM mode, report information indicating that the device is capable of supporting a downlink 256QAM mode to a base station.

It should be appreciated that, the functions of the device in FIG. 3 may refer to the above-mentioned method for indicating the MCS and receiving the downlink data. These functions of the units included in the device may be implemented by programs running on a processor, or by logic circuits.

Obviously, the above units or steps may be implemented by a general-purpose computer. They may be centralized on a single computer or distributed over a network including a plurality of computers. Alternatively, they may be implemented by program codes which can be executed by the computer. Hence, they may be stored in a memory and then executed by the computer, or they may be manufactured into integrated circuit modules, or some units or steps may be manufactured into a single integrated circuit module. In this regard, the present disclosure is not limited to any specific combination of hardware and software.

The above are merely the preferred embodiments of the present disclosure, but shall not be used to limit the scope of the present disclosure.

What is claimed is:

1. A method for indicating a modulation and coding scheme (MCS), comprising a step of:
   when it is determined that a user equipment (UE) supports a downlink 256QAM mode, indicating the 256QAM mode using current information indicating the MCS or extended information indicating the MCS in downlink control information (DCI) wherein the step of indicating the 256QAM mode using the current information indicating the MCS or the extended information indicating the MCS in the DCI comprises:
   indicating the 256QAM mode using the last three pieces of indication information in the current information indicating the MCS in the DCI, and enabling a transport block size (TBS) index for the 256QAM mode to be different from those for other modulation modes; or
   indicating the 256QAM mode using the last three pieces of indication information in the current information indicating the MCS in the DCI, and enabling a TBS index for the 256QAM mode to be partially identical to those for the other modulation modes; or
   reducing indication information indicating the other modulation modes from the current information indicating the MCS in the DCI, and indicating the 256QAM mode using the last three pieces of indication information and saved pieces of indication information indicating the other modulation modes in the current information indicating the MCS.

2. The method according to claim 1, comprising the step of enabling the TBS index for the 256QAM mode to be partially identical to those for the other modulation modes by:
   enabling a TBS index for the 30$^{th}$ piece of indication information indicating the 256QAM mode to be identical to that of the 29$^{th}$ piece of indication information indicating a 64QAM mode, and enabling TBS indices for the 31$^{st}$ piece of indication information and the 32$^{nd}$ piece of indication information indicating the 256QAM to be different from the TBS indices for the other modulation modes.

3. The method according to claim 2, further comprising:
   after the UE has received the information indicating the MCS which comprises the indication information indicating the 256QAM mode, receiving downlink data according to the 256QAM mode and a corresponding TBS index.

4. The method according to claim 1, comprising the step of reducing indication information indicating the other modulation modes from the current information indicating the MCS in the DCI, and indicating the 256QAM mode using the last three pieces of indication information and the saved pieces of indication information indicating the other modulation modes in the current information indicating the MCS by:
deleting the last piece of indication information from each of the pieces of indication information indicating the QPSK mode, the pieces of indication information indicating the 16QAM mode and the pieces of indication information indicating the 64QAM mode, respectively, and indicating the 256QAM mode using the last six pieces of indication information; or
deleting one piece of indication information from each of the pieces of indication information indicating the QPSK mode, the pieces of indication information indicating the 16QAM mode and the pieces of indication information indicating the 64QAM mode, and indicating the 256QAM mode using the last six pieces of indication information; or
deleting at most five pieces of indication information from the pieces of indication information indicating the QPSK, 16QAM and 64QAM modes, and indicating the 256QAM mode using the last three pieces of indication information and the saved pieces of indication information indicating the other modulation modes.

5. The method according to claim 4, further comprising:
after the UE has received the information indicating the MCS which comprises the indication information indicating the 256QAM mode, receiving downlink data according to the 256QAM mode and a corresponding TBS index.

6. The method according to claim 1, wherein the step of indicating the 256QAM mode using the extended information indicating the MCS comprises:
adding one bit to the information indicating the MCS in the DCI; and
taking the preceding 29 pieces of indication information as the original indication information indicating the other modulation modes, taking the $30^{th}$ to $38^{th}$ pieces of indication information as the indication information indicating the 256QAM mode, taking the $39^{th}$ to $42^{nd}$ pieces of indication information as the indication information indicating the QPSK, 16QAM, 65QAM and 256QAM modes for the retransmitted downlink data, and taking the other pieces of indication information as the reserved indication information, or
taking the preceding 29 pieces of indication information as the original indication information indicating the other modulation modes, taking the $30^{th}$ to $38^{th}$ pieces of indication information as the indication information indicating the 256QAM mode, and taking the other pieces of indication information as the reserved indication information.

7. The method according to claim 6, further comprising:
after the UE has received the information indicating the MCS which comprises the indication information indicating the 256QAM mode, receiving downlink data according to the 256QAM mode and a corresponding TBS index.

8. The method according to claim 1, further comprising:
after the UE has received the information indicating the MCS which comprises the indication information indicating the 256QAM mode, receiving downlink data according to the 256QAM mode and a corresponding TBS index.

9. The method according to claim 1, further comprising:
after the UE has received the information indicating the MCS which comprises the indication information indicating the 256QAM mode, receiving downlink data according to the 256QAM mode and a corresponding TBS index.

10. A method for receiving downlink data, comprising a step of:
after a user equipment (UE) has received information indicating a modulation and coding scheme (MCS) including indication information indicating a 256QAM mode, receiving the downlink data according to the 256QAM mode and a corresponding transport block size (TBS) index,
wherein the indication information indicate the 256QAM mode by:
indicating the 256QAM mode using the last three pieces of indication information in the current information indicating the MCS in the downlink control information (DCI), and enabling the TBS index for the 256QAM mode to be different from those for other modulation modes; or
indicating the 256QAM mode using the last three pieces of indication information in the current information indicating the MCS in the DCI, and enabling a TBS index for the 256QAM mode to be partially identical to those for the other modulation modes; or
reducing indication information indicating the other modulation modes from the current information indicating the MCS in the DCI, and indicating the 256QAM mode using the last three pieces of indication information and saved pieces of indication information indicating the other modulation modes in the current information indicating the MCS.

11. A device for indicating a modulation and coding scheme (MCS), comprising a determination circuit and an indication circuit, wherein
the determination circuit is configured to determine whether or not a user equipment (UE) supports a downlink 256QAM mode, and when it supports the 256QAM mode and downlink data is to be transmitted to the UE, activate the indication circuit; and
the indication circuit is configured to indicate the 256QAM mode using current information indicating the MCS or extended information indicating the MCS in downlink control information (DCI),
wherein the indication circuit is further configured to:
indicate the 256QAM mode using the last three pieces of indication information in the current information indicating the MCS in the DCI, and enable a TBS index for the 256QAM mode to be different from those for the other modulation modes; or
indicate the 256QAM mode using the last three pieces of indication information in the current information indicating the MCS in the DCI, and enable a TBS index for the 256QAM mode to be partially identical to those for the other modulation modes: or
reduce indication information indicating the other modulation modes from the current information indicating the MCS in the DCI, and indicate the 256QAM mode using the last three pieces of indication information and the saved indication information indicating the other modulation modes in the current information indicating the MCS.

12. The device according to claim 11, wherein the indication circuit is further configured to:
enable a TBS index for the 30$^{th}$ piece of indication information indicating the 256QAM mode to be identical to that of the 29$^{th}$ piece of indication information indicating a 64QAM mode, and enable TBS indices for the 31$^{st}$ piece of indication information and the 32$^{nd}$ piece of indication information indicating the 256QAM to be different from the TBS indices for the other modulation modes.

13. The device according to claim 11, wherein
the indication circuit is further configured to delete the last piece of indication information from each of the pieces of indication information indicating the QPSK mode, the pieces of indication information indicating the 16QAM mode and the pieces of indication information indicating the 64QAM mode, respectively, and indicating the 256QAM mode using the last six pieces of indication information; or
delete one piece of indication information from each of the pieces of indication information indicating the QPSK mode, the pieces of indication information indicating the 16QAM mode and the pieces of indication information indicating the 64QAM mode, and indicate the 256QAM mode using the last six pieces of indication information; or
delete at most five pieces of indication information from the pieces of indication information indicating the QPSK, 16QAM and 64QAM modes, and indicate the 256QAM mode using the last three pieces of indication information and the saved pieces of indication information indicating the other modulation modes.

14. The device according to claim 11, wherein the indication unit circuit is further configured to:
add one bit to the information indicating the MCS in the DCI; and
take the preceding 29 pieces of indication information as the original indication information indicating the other modulation modes, take the 30$^{th}$ to 38$^{th}$ pieces of indication information as the indication information indicating the 256QAM mode, take the 39$^{th}$ to 42$^{nd}$ pieces of indication information as the indication information indicating the QPSK, 16QAM, 65QAM and 256QAM modes for the retransmitted downlink data, and take the other pieces of indication information as the reserved indication information, or
take the preceding 29 pieces of indication information as the original indication information indicating the other modulation modes, take the 30$^{th}$ to 38$^{th}$ pieces of indication information as the indication information indicating the 256QAM mode, and take the other pieces of indication information as the reserved indication information.

15. A device for receiving downlink data, comprising:
a control reception circuit configured to receive information indicating a modulation and coding scheme (MCS) which comprises indication information indicating a 256QAM mode; and
a data reception circuit configured to receive the downlink data according to the 256QAM mode and a corresponding transport block size (TBS) index,
wherein the indication information indicate the 256QAM mode by:
indicating the 256QAM mode using the last three pieces of indication information in the current information indicating the MCS in the downlink control information (DCI), and enabling the TBS index for the 256QAM mode to be different from those for other modulation modes; or
indicating the 256QAM mode using the last three pieces of indication information in the current information indicating the MCS in the DCI, and enabling a TBS index for the 256QAM mode to be partially identical to those for the other modulation modes; or
reducing indication information indicating the other modulation modes from the current information indicating the MCS in the DCI, and indicating the 256QAM mode using the last three pieces of indication information and saved pieces of indication information indicating the other modulation modes in the current information indicating the MCS.

16. The device according to claim 15, further comprising:
a transmission circuit configured to report information indicating that the device is capable of supporting a downlink 256QAM mode to a base station.

* * * * *